(12) United States Patent
Ueberschlag et al.

(10) Patent No.: US 9,175,994 B2
(45) Date of Patent: Nov. 3, 2015

(54) ULTRASONIC TRANSDUCER FOR A FLOW MEASURING DEVICE

(71) Applicant: Endress + Hauser Flowtec AG, Reinach (CH)

(72) Inventors: Pierre Ueberschlag, Saint-Louis (FR); Michael Bezdek, Aesch (CH); Andreas Berger, Hasel (DE)

(73) Assignee: Endress + Hauser Flowtec AG, Reinach (CH)

( * ) Notice: Subject to any disclaimer, the term of this patent is extended or adjusted under 35 U.S.C. 154(b) by 370 days.

(21) Appl. No.: 13/728,002

(22) Filed: Dec. 27, 2012

(65) Prior Publication Data

US 2013/0192386 A1 Aug. 1, 2013

(30) Foreign Application Priority Data

Dec. 29, 2011 (DE) .......................... 10 2011 090 082

(51) Int. Cl.
*H01L 41/113* (2006.01)
*G01F 1/66* (2006.01)
*B06B 3/00* (2006.01)
*G10K 11/04* (2006.01)

(52) U.S. Cl.
CPC ... *G01F 1/66* (2013.01); *B06B 3/00* (2013.01); *G01F 1/662* (2013.01); *G10K 11/04* (2013.01)

(58) Field of Classification Search
CPC ............ G01L 1/16; G01L 1/162; G01L 23/10

USPC ................. 310/323.01–323.19, 323, 21, 324, 310/326–328, 338, 348; 73/35.11, 35, 13, 73/504.05, 504.06, 861.1–861.95, 861.21
See application file for complete search history.

(56) References Cited

U.S. PATENT DOCUMENTS

| 4,011,473 | A | * | 3/1977 | Massa ........................... 310/335 |
| 4,156,158 | A | | 5/1979 | Wilson | |
| 4,183,007 | A | * | 1/1980 | Baird ............................. 367/119 |
| 4,417,480 | A | * | 11/1983 | Zacharias, Jr. ............. 73/861.18 |
| 4,770,038 | A | | 9/1988 | Zuckerwar | |

(Continued)

FOREIGN PATENT DOCUMENTS

DE 28 35 367 3/1979
DE 10153297 A1 4/2003

(Continued)

OTHER PUBLICATIONS

International Search Report, Feb. 1, 2013, The Netherlands.

(Continued)

*Primary Examiner* — Thomas Dougherty
(74) *Attorney, Agent, or Firm* — Bacon & Thomas, PLLC

(57) ABSTRACT

An ultrasonic transducer for an ultrasonic flow measuring device, comprising a first housing part having an ultrasonic window and adjoining, rotationally symmetric walls, wherein there adjoins on the walls of the first housing part, coaxially with the walls of the first housing part, a first ring as resonator, which forms an end of the first housing part.

14 Claims, 3 Drawing Sheets

(56) References Cited

U.S. PATENT DOCUMENTS

| | | | |
|---|---|---|---|
| 5,664,456 A * | 9/1997 | Eckert | 73/290 V |
| 6,268,683 B1 * | 7/2001 | Li | 310/348 |
| 6,276,212 B1 * | 8/2001 | Cooper et al. | 73/632 |
| 6,431,908 B1 * | 8/2002 | Beck et al. | 439/500 |
| 6,584,862 B1 | 7/2003 | Molenaar | |
| 7,614,309 B2 | 11/2009 | Rieder | |
| 7,973,453 B2 | 7/2011 | Van Klooster | |
| 2002/0021056 A1 * | 2/2002 | Amaike et al. | 310/324 |
| 2007/0035212 A1 * | 2/2007 | Straub et al. | 310/348 |
| 2010/0011867 A1 | 1/2010 | Van Klooster et al. | |
| 2013/0014592 A1 * | 1/2013 | Mueller et al. | 73/861.27 |
| 2013/0167654 A1 * | 7/2013 | Ueberschlag et al. | 73/861.18 |

FOREIGN PATENT DOCUMENTS

| | | | |
|---|---|---|---|
| DE | 10205545 A1 | 6/2003 | |
| DE | 10356114 A1 | 6/2005 | |
| DE | 102008033098 A1 | 1/2010 | |
| DE | 102010064117 A1 | 6/2012 | |
| WO | WO 99/10110 | 3/1999 | |
| WO | WO2011/085872 * | 7/2011 | G01F 1/66 |

OTHER PUBLICATIONS

English Translation of the IPR, WIPO, Geneva, Jul. 10, 2014.

* cited by examiner

ULTRASONIC TRANSDUCER FOR A FLOW MEASURING DEVICE

TECHNICAL FIELD

The present invention relates to an ultrasonic transducer for an ultrasonic flow measuring device. The ultrasonic transducer includes a first housing part having an ultrasonic window and adjoining, rotationally symmetric walls.

BACKGROUND DISCUSSION

Ultrasonic flow measuring devices are applied often in process- and automation technology. They permit simple determination of volume flow and/or mass flow in a pipeline. Known ultrasonic flow measuring devices frequently work according to the travel-time difference principle. According to this principle, the different travel times of ultrasonic waves, especially ultrasonic pulses, so-called bursts, are evaluated relative to the flow direction of the fluid. For this, ultrasonic pulses are sent at a certain angle to the tube axis both with the flow as well as also counter thereto. From the travel-time difference, the flow velocity and therewith, in the case of known diameter of the pipeline section, the volume flow can be determined.

The ultrasonic waves are produced, respectively received, with the aid of so-called ultrasonic transducers. For this, ultrasonic transducers are mounted in the tube wall of the relevant pipeline section. The ultrasonic transducers are, normally, composed of an electromechanical transducer element, e.g. a piezoelectric element, and an ultrasonic window. The ultrasonic waves are produced as acoustic signals in the electromechanical transducer element and led to the ultrasonic window and from there in-coupled into the fluid, or measured medium. The ultrasonic window is also referred to as a membrane.

Between the piezoelectric element and the ultrasonic window, a so called adapting, or matching, layer can be arranged. The adapting, or matching, layer performs, in such case, the function of transmission of the ultrasonic signal and simultaneously the reduction of a reflection on interfaces between two materials caused by differing acoustic impedances.

SUMMARY OF THE INVENTION

An object of the invention is to provide an ultrasonic transducer suitable for measuring gas flow.

The object is achieved by the ultrasonic transducer for an ultrasonic flow measuring device which includes a first housing part having a planar area suitable as an ultrasonic window with adjoining, rotationally symmetric walls. The ultrasonic transducer is so embodied according to the invention that there adjoins on the walls of the first housing part, coaxially to the walls of the first housing part, a first ring as a resonator terminating the first housing part in the axial direction to form a first end of the first housing part. The ultrasonic window of the first housing part forms, in such case, a second end of the first housing part. The resonator borders the first housing part in the axial direction. The first ring is advantageous arranged otherwise freely in the radial direction. In this way, movements of the first ring perpendicular to the rotational axis are not limited by other components, so that the first ring can oscillate freely. The resonator attenuates, or damps, body sound waves disturbing the measurement signal, and, thus, suppresses their transmission from the first housing part to the pipeline wall and, via the wall, to an additional ultrasonic transducer.

The first housing part includes especially a beaker shaped region, with the ultrasonic window forming the floor of the beaker shaped region. An electromechanical transducer element is arranged against the floor. The electromechanical transducer element is excited with a predetermined frequency, the so-called excitation frequency. The excitation frequency is especially the center frequency of the oscillation of the electromechanical transducer element, or of the acoustic signal produced therefrom. In a form of embodiment of the ultrasonic transducer of the invention, the first housing part is embodied bottle shaped, wherein the bottle floor forms the ultrasonic window, and wherein the resonator is arranged on a conically tapering end of the walls. The walls of the first housing part are thin relative to the extension of the first housing part along its rotational axis.

In a further development of the ultrasonic transducer of the invention, it is provided that the ultrasonic transducer includes a membrane for mechanical coupling of the first housing part with a pipeline, which membrane is so connected with a lateral surface of the first ring, that the first end of the first housing part has a distance of $\lambda/100$ to $3\lambda/4$ to a first surface of the membrane, wherein the lateral surface of the first ring limits the outer diameter of the first ring. $\lambda$ represents, in such case, the wavelength of the acoustic signal in the corresponding component, here the first ring, which acoustic signal is transmitted from the electromechanical transducer element into the first housing part and propagates there as body sound with the wavelength $\lambda$. The wavelength $\lambda$ depends, in such case, on the velocity of sound, especially in the longitudinal direction, in the corresponding component, which is a property of the material, and depends on the excitation frequency, with which the electromechanical transducer element is excited for oscillation and therewith for producing the acoustic signal. The membrane lies in a plane perpendicular to the axis of the first ring. It has, advantageously, a thickness in a range of $\lambda/40$ to $\lambda/4$ of the longitudinal wavelength of the acoustic signal in the first ring. In a further development, a second surface of the membrane is arranged on the first ring aligned with a second end of the ring lying opposite the first end. The distance of the first end of the first housing part to the membrane establishes then the width of the first ring and corresponds to such.

The first housing part is secured by means of the membrane to a pipeline or to an additional, second housing part of the ultrasonic transducer. For example, the membrane is biased against an axial stop of a second housing part. The membrane is connected with the first ring, especially by material bonding, especially joint-freely. The holding of the first housing part occurs, thus, via the membrane.

In a further development of the solution of the invention, a distance of the lateral surface of the first ring to a connecting surface of the membrane amounts to $\lambda/100$ to $\lambda/2$, with $\lambda$ being the longitudinal wavelength in the membrane of the acoustic signal produced by the ultrasonic transducer. The connecting surface of the membrane means the area, with which the membrane is mechanically coupled with an additional component, for example, a second ring of the resonator or the pipeline or a second housing. The area can, thus, form an axial stop, which is biased against an axial stop of the second housing.

In an additional further development of the invention, the first ring has an inner diameter in a range of 0 to $\lambda/2$, and an outer diameter in a range of $\lambda/10$ to $(3/4)*\lambda$, and a width in a range of $\lambda/100$ to $3/4\lambda$, wherein $\lambda$ represents the wavelength of the acoustic signal produced by the ultrasonic transducer, calculated with the longitudinal velocity of sound in the material of the first ring.

The first ring, in a form of embodiment, has a thickness of $\lambda/40$ to $\lambda/4$. The thickness of the first ring is measured perpendicular to the axis of rotation. It corresponds to the difference between the outer diameter of the first ring divided by two and half of the inner diameter of the first ring.

In another further development of the ultrasonic transducer of the invention, the resonator includes a second ring arranged coaxially to the walls of the first housing part. Especially, the first and the second rings are connected with one another via the membrane, which lies in a plane perpendicular to the axis of the two rings and therewith perpendicular to the axis of rotation of the walls of the first housing part. The electromechanical transducer element of the ultrasonic transducer is excited to execute oscillations, especially in a predetermined interval around its eigenfrequency. The wavelength $\lambda$ in a body, here the first ring or the walls of the first housing part, depends then on, besides the oscillation frequency of the electromechanical transducer element, the material-specific velocity of sound.

Another further development of the invention is that in which the second ring has an inner diameter in a range of $\lambda/8$ to $(3/4)*\lambda$, and the second ring has an outer diameter in a range of $\lambda/4$ to $\lambda$, and the second ring has a width in a range of $\lambda/100$ to $3/4\lambda$, with $\lambda$ being the longitudinal wavelength of the acoustic signal produced by the ultrasonic transducer in the second ring. The second ring has, in a further development, a thickness of $\lambda/40$ to $\lambda/4$.

In an additional further development, the separation of the first and second rings amounts to at least $\lambda/100$, especially at least $\lambda/40$, especially to $\lambda/20$ to $\lambda/2$ of the wavelength of the acoustic signal produced by ultrasonic transducer in the membrane.

In a form of embodiment, in each case, a thickness between the inner- and outer diameters of the first and second rings is equally large. The thickness of the membrane is measured parallel to the ring axis, or perpendicular to the plane of the membrane, while, in contrast, the thickness of the rings is measured parallel to the plane of the membrane.

In an additional further development of the invention, the ultrasonic transducer includes a second housing part, wherein the first housing part is guided axially in the second housing part and is so biased against the second housing part that, in a first state of the ultrasonic transducer, a first axial stop of the first housing part rests on a first axial stop of the second housing part, wherein, by applying a predetermined force counter to the bias on a second axial stop of the first housing part, the first housing part is axially shiftable, so that, in a second state of the ultrasonic transducer, the second axial stop of the first housing part is moved out of the first state.

In an additional embodiment of the invention, the second stop of the first housing part comprises the membrane, especially the surface of the membrane facing away from the resonators. The second stop of the first housing part is, in an embodiment, a sealing surface on a periphery of the first housing part. For example, a sealing ring is arranged on the surface of the membrane.

In an example of an embodiment of the ultrasonic transducer of the invention, the first housing part has a first axial stop and a third axial stop acting opposite sense to that of the first axial stop, wherein the first axial stop and the third axial stop of the first housing part are arranged between a first axial stop of the second housing part and a second axial stop of the second housing part acting with opposite sense to that of the first axial stop of the second housing part, wherein, by applying a predetermined force on the first housing part counter to the bias, the first housing part is axially shiftable, until, inn a additional state of the ultrasonic transducer, the third axial stop of the first housing part rests on the second axial stop of the second housing part. For example, the first and third axial stops of the first housing part are replaced by a bidirectionally acting stop, for example, a retaining ring, which is arranged in a groove in the first housing part, especially in a coaxially peripheral, annular groove in the second ring of the resonator.

In an additional variant of the invention, the first housing part surrounds an electromechanical transducer element, which is biased with suitable means against an ultrasonic window of the first housing part of the ultrasonic transducer, wherein a first surface of the electromechanical transducer element faces the ultrasonic window. Especially, then a second surface of the electromechanical transducer element lying opposite the first surface is divided into a number of segments, which are connected galvanically with the means for biasing. For example, the second surface of the electromechanical transducer element is divided into four equally large segments. The means for biasing comprises e.g. a compression coil spring, which, for galvanic contacting of the electromechanical transducer element, has at least one, especially two spiral shaped windings extending in a plane. Usually, a coupling means, e.g. grease, is arranged between the electromechanical transducer element and the ultrasonic window. The electromechanical transducer element is especially a piezoelectric element with a predetermined eigenfrequency, with which it is excited. It is usually operated in the so-called thickness mode.

Another further development of the invention provides that the ultrasonic transducer has an adapting, or matching, layer, which interfaces the ultrasonic transducer with the environment, wherein the ultrasonic window is arranged between the electromechanical transducer element and the adapting, or matching, layer. The adapting, or matching, layer comprises especially a composite matrix with spherical bodies embedded therein.

Another further development of the invention is that in which a function of the distance of each section edge of an outer contour of the first housing part to a longitudinal axis of the first housing part is monotonic from the ultrasonic window up to the second axial stop, wherein each section edge lies in a plane, in which the longitudinal axis of the first housing part lies.

In an additional further development of the invention, the ultrasonic transducer is so constructed that an inner diameter of the walls equals the inner diameter of the first ring. First ring and walls of the first housing part are thus aligned. The outer radius of the walls of the first housing part is, in an example of an embodiment, in contrast, at least 60%, especially at least 80%, less than the outer radius of the first ring. The ring has thus a significantly greater thickness than the walls. The walls have especially the same thickness as the membrane, thus between $\lambda/100$ and $\lambda/5$, with $\lambda$ being the longitudinal wavelength in the walls for the acoustic signal produced by the ultrasonic transducer.

Moreover, the first ring is advantageously of the same material as the walls of the first housing part and, in given cases, as well as also the ultrasonic window, especially of a metal or a metal alloy, especially stainless steel. The first ring is connected with the walls by material bonding, for example, by welding. In an additional form of embodiment of the invention, the first ring and the walls of the first housing part are produced monolithically.

BRIEF DESCRIPTION OF THE DRAWINGS

The invention can be embodied in numerous ways. Some of these will now be explained in greater detail based on the figures of the drawing. Equal elements are provided in the figures with equal reference characters. The figures of the drawing show as follows.

DETAILED DISCUSSION IN CONJUNCTION WITH THE DRAWINGS

Figure 1:
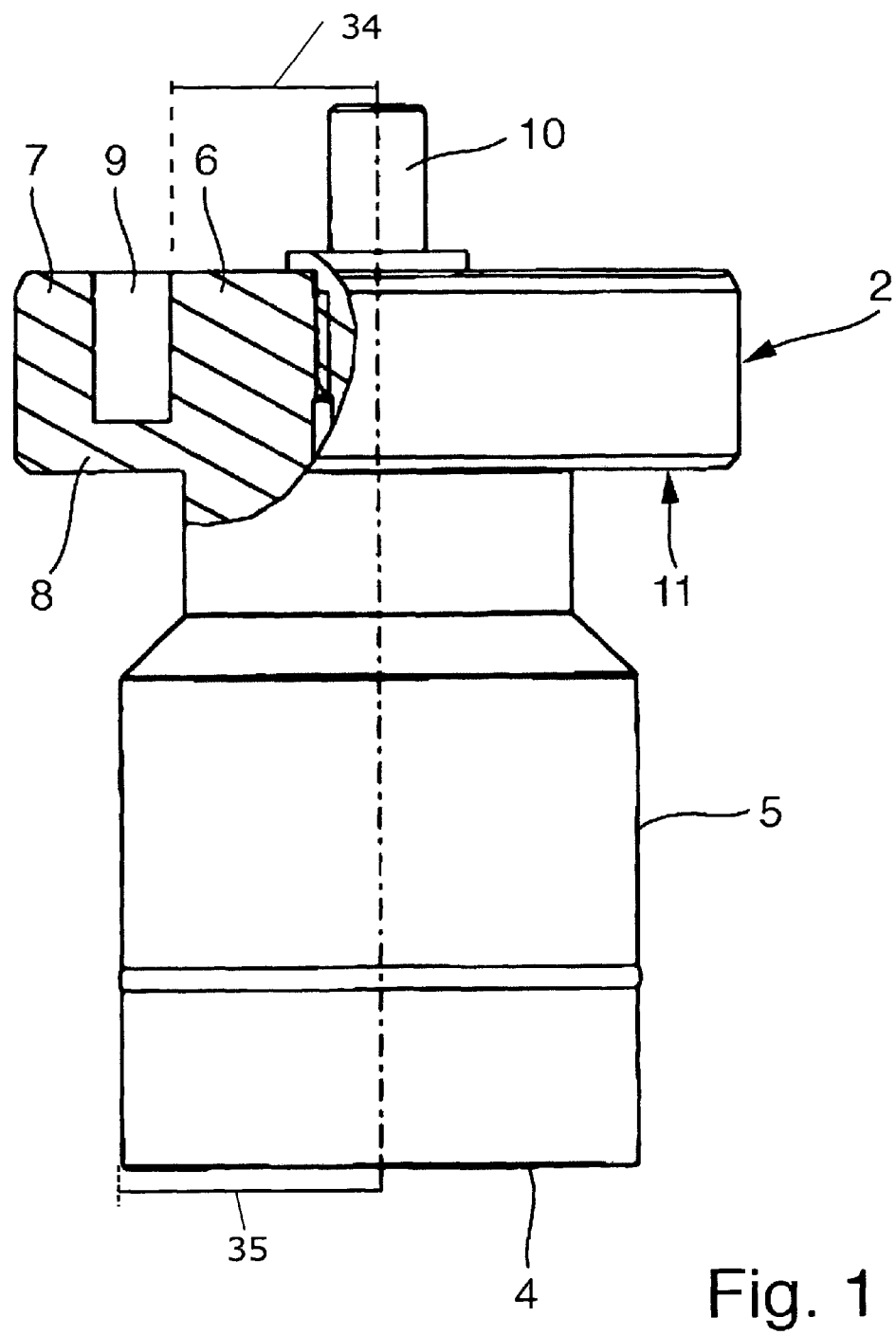
FIG. 1 is a partial sectioned view of ultrasonic transducer of the invention.

FIG. 1 shows an ultrasonic transducer 1 of the invention, with a detail section through a resonator of the invention. The other figures show the ultrasonic transducer in additional views. The figures are described below as one group.

The ultrasonic transducer 1 of the invention includes a first housing part 2 with rotationally symmetric walls 5 and an ultrasonic window 4, on which an electromechanical transducer element is arranged. Here, the conically tapering, first housing part 2 is bottle shaped. It includes, coaxially with the walls of the first housing part 2, a first ring 6 as part of a resonator, which forms an end of the first housing part 2. The ring 6 is connected joint-freely with the walls 5 of the first housing part 2. Especially, ring 6 and walls 5 are produced monolithically to form the first housing part 2. In given cases, the walls 5 are also embodied monolithically with the ultrasonic window 4. The first ring 6 forms, thus, the end of the first housing part 2, since it borders the first housing part 2 in the axial direction. This should not exclude, however, that other components of the first housing part 2 can protrude beyond the first ring 6.

The outer radius of the first ring 6 is shown as 34, while the outer radius of the walls 5 is shown as 35 in FIG. 1.

Furthermore, the first ring 6 is especially free of acoustic couplings in the radial direction, thus perpendicular to the axis of rotation, so that oscillations of the first ring 6 are not limited in this direction by other components. Here, in the inner space of the first ring 6, a plug 10 is positioned for electrical contacting of the ultrasonic transducer 1. Plug 10 does not, however, contact the first ring 6 on its edges in the radial direction. It bears only on the end of the first ring 6. In a variant (not shown), the first ring 6 is also free of contact in the axial direction.

Figure 5:
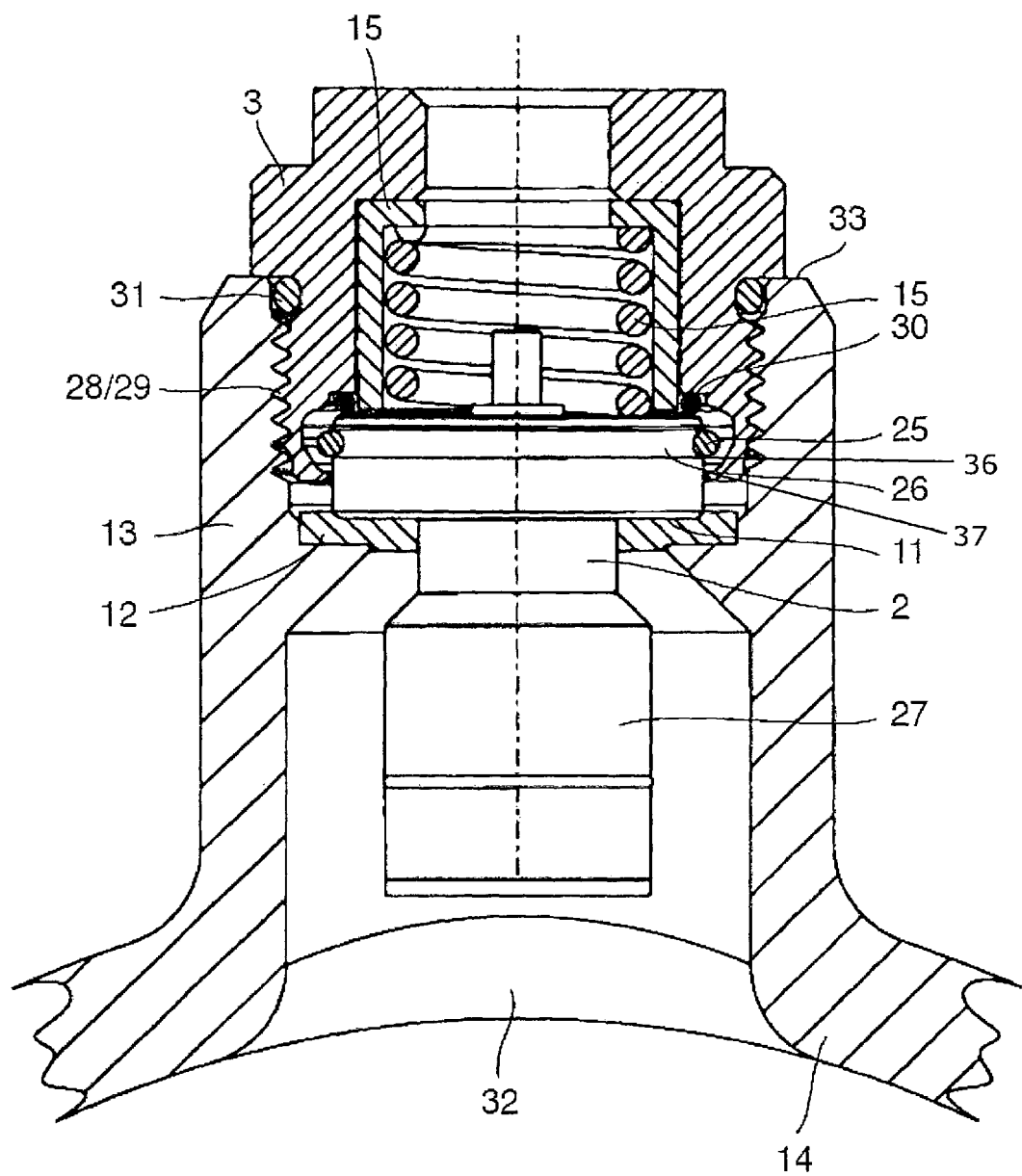
FIG. 5 is an ultrasonic transducer of the invention installed in a pipeline.

Adjoining the first ring 6 in the radial direction is a membrane 8, which is also part of the resonator. By means of membrane 8, the first housing part 2 is securable to an additional housing part or to the pipeline. For example, membrane 8, especially the side of the membrane facing away from the resonator, serves as an axial stop and, thus, as a bearing surface 11 of the first housing part 2 on a corresponding axial stop of the second housing part or the pipeline and, in given cases, is biased against these. Here, the bearing surface 11 is partly an end of a second ring 7. FIG. 5 shows a seal compressed between the first housing part 2 and a connection 13 serving as interface of a pipeline 14.

Transmission of the acoustic signal from the first housing part 2 to the pipeline 14 or an additional housing part occurs especially via the membrane 8. Otherwise, the first housing part 2 is acoustically and, in given cases, also mechanically, decoupled from the pipeline 14 or an additional housing part.

The resonator is caused to oscillate by the oscillations of the electromechanical transducer element. In such case, the main oscillation mode of the first ring 6 is directed radially to the longitudinal axis of the first ring 6. The membrane 8 is here arranged at an oscillation node on a second ring 7, which makes a transmission of the acoustic signal to the second ring 7 or especially to the pipeline 14 or an additional housing part difficult.

Arranged in the gap 9 between the first and second rings 6 and can be a first spring 15, especially a compression coil spring, for biasing the first housing part 2 relative to a further housing part or relative to the pipeline. A cage 34 around the first spring 15 is provided for electrical, and especially also for acoustic, decoupling of the first and second housing parts 2 and 3. The first spring 15 is axially guided in the cage 34, which comprises a polymer, for example.

The first housing part 2, the ultrasonic window 4, the walls 5, the membrane 8, the first and, in given cases, the second ring 6 and 7 are composed of a metal or a metal alloy, especially stainless steel. Therewith, they typically have an elastic modulus of 50 kN/mm2 to 400 kN/mm2.

Figure 2:
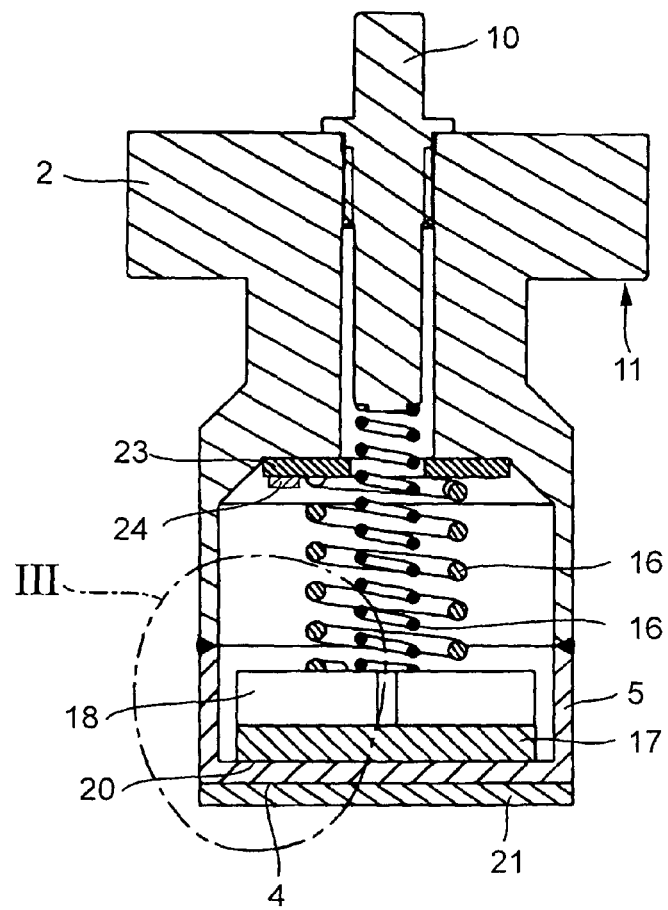
FIG. 2 is an additional section through an ultrasonic transducer of the invention.
Figure 3:
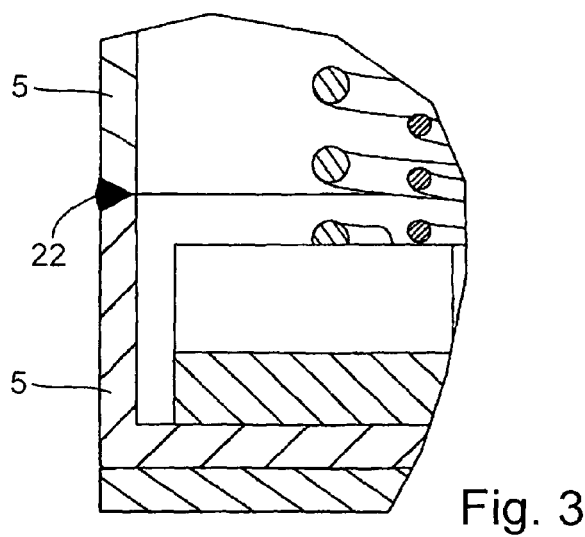
FIG. 3 is a detail of FIG. 2.
Figure 4:
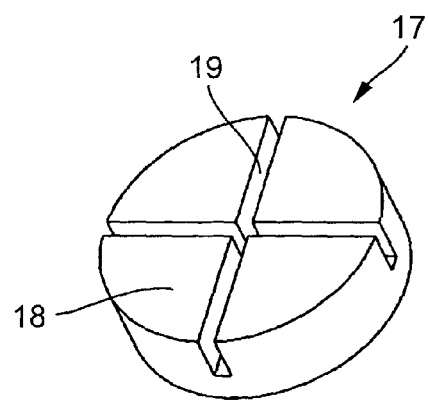
FIG. 4 is an electromechanical transducer element of the invention.

The first housing part 2 of the ultrasonic transducer 1 in FIG. 2 includes two parts, which are connected with one another by material bonding by means of a weld seam 22. Especially, they are welded together by means of laser welding. The lower part has a beaker shape and includes the ultrasonic window 4 as floor. It surrounds an electromechanical transducer element 17, which is arranged against the ultrasonic window 4 and biased to bear against such by suitable biasing means 16. A coupling means (not shown) can be inserted between the electromechanical transducer element 17 and the ultrasonic window 4.

Since the lower region of the figure has a shell shape congruent with the walls of the upper part, in order to be able to connect it therewith, while being conically tapered in an upper region, the electromechanical transducer element 17 and the, in given cases present, coupling means are inserted before the connecting of the two parts. In order, however, not to damage these during the connecting, the cross sectional area A of a housing wall of the first housing part 2, the distance d of the connecting surface of the two parts to the ultrasonic window 4, thus the distance of the weld seam 22 to the ultrasonic window 4, and the material of the first housing part are so selected and matched to one another that the ultrasonic window does not get warmer than 100° C., especially not warmer than 80° C., during the welding. Stainless steel as material for the first housing part 2 has typically a thermal conductivity of 10 to 100 W/(m*K).

Provided as means for biasing are here two compression coil springs 16. They produce predetermined forces in the direction of the ultrasonic window 4 and apply such to the electromechanical transducer element 17, whereby element 17 is pressed to bear against the ultrasonic window 4. At the same time, the means 16 for biasing contact the electromechanical transducer element 17 electrically. Thus, the applying of one or more additional electrodes on the electromechanical transducer element 17 is unnecessary.

The means 16 for biasing contact a second surface of the electromechanical transducer element 17 galvanically. The first surface 20 of the electromechanical transducer element 17 is electrically contacted by the ultrasonic window 4. For this, the first housing part 2 is produced especially of an electrically conductive material. In order to prevent a short circuit, the means 16 for biasing are installed free of contact with the first housing part 2. Here, they are supported on a circuit board 23, which also serves as an electrical insulator. The electrical circuit is closed via an electrical resistor 24. Here the ultrasonic transducer 1 also includes a plug 10 in a bore in the first housing part 3, by which there occurs the electrical contacting and therewith the exciting by, and the tapping of, the voltage signals on the electromechanical transducer element 17. Electrical lines are not shown here in greater detail.

According to the invention, the first surface 20 of the electromechanical transducer element 17 is planar and the second surface is divided into segments 18, here four equally large, quarter circle shaped segments 18. This happens in simple manner by one or more cuts 19 through the second surface of the electromechanical transducer element 17.

An adapting, or matching, layer 21 for matching acoustic impedances is provided here outside of the housing of the ultrasonic transducer 1. It is so placed against the ultrasonic window 4 that the ultrasonic window 4 is located between the adapting, or matching, layer 21 and the electromechanical transducer element 17. The adapting, or matching, layer 21 contacts, thus, the fluid, whose flow is to be measured.

In the shown form of embodiment, the ultrasonic transducer 1 includes an axial stop 11, which can be tightened against an axial stop of a further housing part or a pipeline, for the installation of the ultrasonic transducer 1 into a pipeline. This axial stop 11 can itself be embodied as a sealing surface, or a seal is arranged between it and the axial stop of the third housing part or the pipeline.

For positioning the electromechanical transducer element 17 at a predetermined position in the ultrasonic transducer 1 during the manufacturing process, centering lugs (not shown) can be provided in the first housing part 2.

Advantageous, additionally, is a smooth surface of the housing of the ultrasonic transducer 1. Thus, especially, the weld seam 22 is not elevated relative to the lateral surface of the housing. A function of the distance of each section edge of an outer contour of the housing to a longitudinal axis of the housing is, thus, monotonic from the ultrasonic window 4 up to the axial stop 11, wherein each section edge lies in a plane, in which the longitudinal axis of the housing lies.

The ultrasonic transducer 1 of the invention includes a first housing part 2 and second housing part 3, wherein the first housing part 2 is axially guyided in the second housing part b3. The first housing part 2 includes a retaining ring 25 in the form of a bidirectionally acting, axial stop. Here a peripheral annular groove 26 extending coaxially on the outer contour of the second ring of the first housing part 2 seats the retaining ring 9, which protrudes out from the annular groove 26. The retaining ring 25 is located as axial stop between a first axial stop 36 and a second axial stop 37 of the second housing part 3 acting with sense opposite to that of the first axial stop.

Thus, the first housing part 2 is axially shiftable relative to the second housing part 3 between a first state, where the retaining ring 25 rests as axial stop on the first axial stop of the second housing part 3, and a third state, where the retaining ring 25 rests as axial stop on the second axial stop of the second housing part 3. Illustrated here is a second state, where the retaining ring 25 is located, free of force, between the first and second axial stops of the second housing part 3. The retaining ring 25 is not in contact with either of the first and second axial stops of the second housing part 3.

This state is reached by so arranging a compression coil spring 15 between first and second housing parts 2 and 3 that the second housing part 3 is biased relative to the first housing part 2 and by providing a second axial stop 11 on the first housing part 2, on which a force directed counter to the bias can be applied and is applied. The axial stop 11 is, in such case, coaxially peripherally embodied and serves as a sealing surface against an additional axial stop of an interface 13 of the pipeline 14, against which the axial stop 11 of the first housing part 2 lies and via which force is introduced into the axial stop 11. By forcing the second housing part 3 toward the first housing part 2, a seal 12 between the stops is compressed and seals, consequently, between pipeline 14 and ultrasonic transducer 1, so that no fluid located in the pipeline 14 can escape from it. Alternatively to said compression coil spring 15, also any other suitable means for biasing the second housing part 3 relative to the first housing part 2 can be used. The axial stop of the interface 13 of the pipeline 14 is here formed by a shoulder protruding into a bore 27, in which the ultrasonic transducer 1 is mounted into the pipeline 14. Here, the bore 27 is provided in a connection 13 of the pipeline 14 adapted to serve as the interface. Alternatively, also a casing or any other suitable interface can be secured on the pipeline 14 and the ultrasonic transducer 1 mounted therein, against an axial stop thereof.

Especially, interface 13 has an internal thread 28 and the second housing part 2 a thereto complementary, external thread 29, for releasable securement of the ultrasonic transducer 1 to the pipeline 14. A screwed securement is a force- and a shape interlocking connection. Alternatively, however, options also include only a force-, or a shape, interlocking connection. For example, the ultrasonic transducer 1 is just inserted and pressed against the pipeline 14 with a means suitable therefor.

Other seals can be provided. Thus, there is provided here a first O-ring 30 between the first and second housing parts 2 and 3, in order to seal these relative to one another. A second O-ring 31 is located in the shown variant of the ultrasonic transducer 1 between the second housing part 3 and the connection 13, above the threads as viewed from the lumen 32 of the pipeline. The second housing part 3 is screwed into the connection 13, until it comes to rest on the shoulder 33, whereby the O-ring 31 is compressed with a predetermined force.

The compression coil spring 15 is guided in an electrically non-conducting cage 34, for example, of a polymer, in the second housing part 3. Cage 34 serves also for the acoustic decoupling of the two housing parts.

The invention claimed is:

1. An ultrasonic transducer for an ultrasonic flow measuring device, comprising:
    an electromechanical transducer element for producing an acoustic signal with a predetermined excitation frequency;
    a first housing part having an ultrasonic window and adjoining, rotationally symmetric walls; and
    a first ring, wherein:
    there adjoins on the walls of said first housing part, coaxially with the walls of said first housing part, said first ring as a resonator, which forms an end of said first housing part, said resonator serves for suppression of the transmission of body sound waves.

2. The ultrasonic transducer as claimed in claim 1, wherein: said first ring has an inner diameter in a range of $\frac{1}{8}\lambda$ to $\frac{3}{4}\lambda$, an outer diameter in a range of $\frac{1}{4}\lambda$ to $\lambda$, and a width in a range of $\frac{1}{100}\lambda$ to $\frac{3}{4}\lambda$, with $\lambda$ being the longitudinal wavelength of the acoustic signal in said first ring produced by the ultrasonic transducer.

3. The ultrasonic transducer as claimed in claim 1, wherein: perpendicular to the axis of said first ring, a membrane is included, which is so connected with a lateral surface of said first ring that the first end of said first housing part has a distance of at least $\frac{1}{100}\lambda$ to said membrane, with $\lambda$ being the longitudinal wavelength of the acoustic signal in said first ring produced by the ultrasonic transducer.

4. The ultrasonic transducer as claimed in claim 3, wherein:
arranged coaxially with the walls of said first housing part, is a second ring, which is connected with said first ring via said membrane.

5. The ultrasonic transducer as claimed in claim 4, wherein the separation of said first and said second rings amounts to at least $\frac{1}{100}\lambda$, with $\lambda$ being the longitudinal wavelength of the acoustic signal in said first ring produced by the ultrasonic transducer.

6. The ultrasonic transducer as claimed in claim 1, further comprising:
a second housing part, wherein said first housing part in said second housing part is so axially guided in and biased relative to said second housing part that, in a first state of the ultrasonic transducer, a first axial stop of said first housing part rests on a first axial stop of said second housing part, wherein:
by applying a predetermined force, counter to the bias, on a second axial stop of said first housing part, said first housing part is axially shiftable, so that, in a second state of the ultrasonic transducer, said second axial stop of said first housing part is moved out of said first state.

7. The ultrasonic transducer as claimed in claim 1, wherein:
said first housing part surrounds said electromechanical transducer element, which is biased by biasing means against the ultrasonic window of said first housing part; and
a first surface of said electromechanical transducer element faces said ultrasonic window.

8. The ultrasonic transducer as claimed in claim 7, wherein:
a second surface of said electromechanical transducer element lying opposite said first surface is divided into a number of segments, which are galvanically connected with said biasing means.

9. The ultrasonic transducer as claimed in claim 7, further comprising:
an adapting, or matching, layer, which interfaces the ultrasonic transducer with an environment, wherein:
said ultrasonic window is arranged between said electromechanical transducer element and said adapting, or matching, layer.

10. The ultrasonic transducer as claimed in claim 7, wherein:
a function of the distance of each section edge of an outer contour of said first housing part to a longitudinal axis of said first housing part is monotonic from said ultrasonic window up to said second axial stop; and
each section edge lies in a plane, in which the longitudinal axis of said second housing part lies.

11. The ultrasonic transducer as claimed in claim 1, wherein:
an inner diameter of the walls equals the inner diameter of said first ring.

12. The ultrasonic transducer as claimed in claim 1, wherein:
an outer radius of the walls is at least 60% less than the outer radius of said second ring.

13. The ultrasonic transducer as claimed in claim 1, wherein:
the walls of said first housing part and said first ring are composed of the same material.

14. The ultrasonic transducer as claimed in claim 13, wherein:
the walls of said first housing part and said first ring are monolithic.

* * * * *